United States Patent [19]
Siegel

[11] 4,025,798
[45] May 24, 1977

[54] FAIL-SAFE CIRCUIT

[75] Inventor: Leon Sidney Siegel, Tulsa, Okla.

[73] Assignee: Combustion Engineering, Inc., Windsor, Conn.

[22] Filed: Oct. 3, 1975

[21] Appl. No.: 619,554

[52] U.S. Cl. .............................. 307/118; 73/290 R; 340/244 R; 361/194
[51] Int. Cl.² ........................................ G01F 23/00
[58] Field of Search ......... 307/118; 73/290 R, 291; 340/244 R, 236; 137/386, 387, 392, 424; 317/148.5 R

[56] References Cited
UNITED STATES PATENTS 3,275,898   9/1966   Rosso et al. ................. 317/148.5 R Primary Examiner—Herman Hohauser
Attorney, Agent, or Firm—Arthur L. Wade

[57] ABSTRACT

An electric system normally responsive to radiation over a path traversed by a body of material. An auxiliary radiation source generates a continuous signal through the portion of the circuit monitored for failure. The continuous signal opposes deenergization of the system relay during the period the material blocks normal radiation to the system and while the monitored circuit is operative.

4 Claims, 1 Drawing Figure

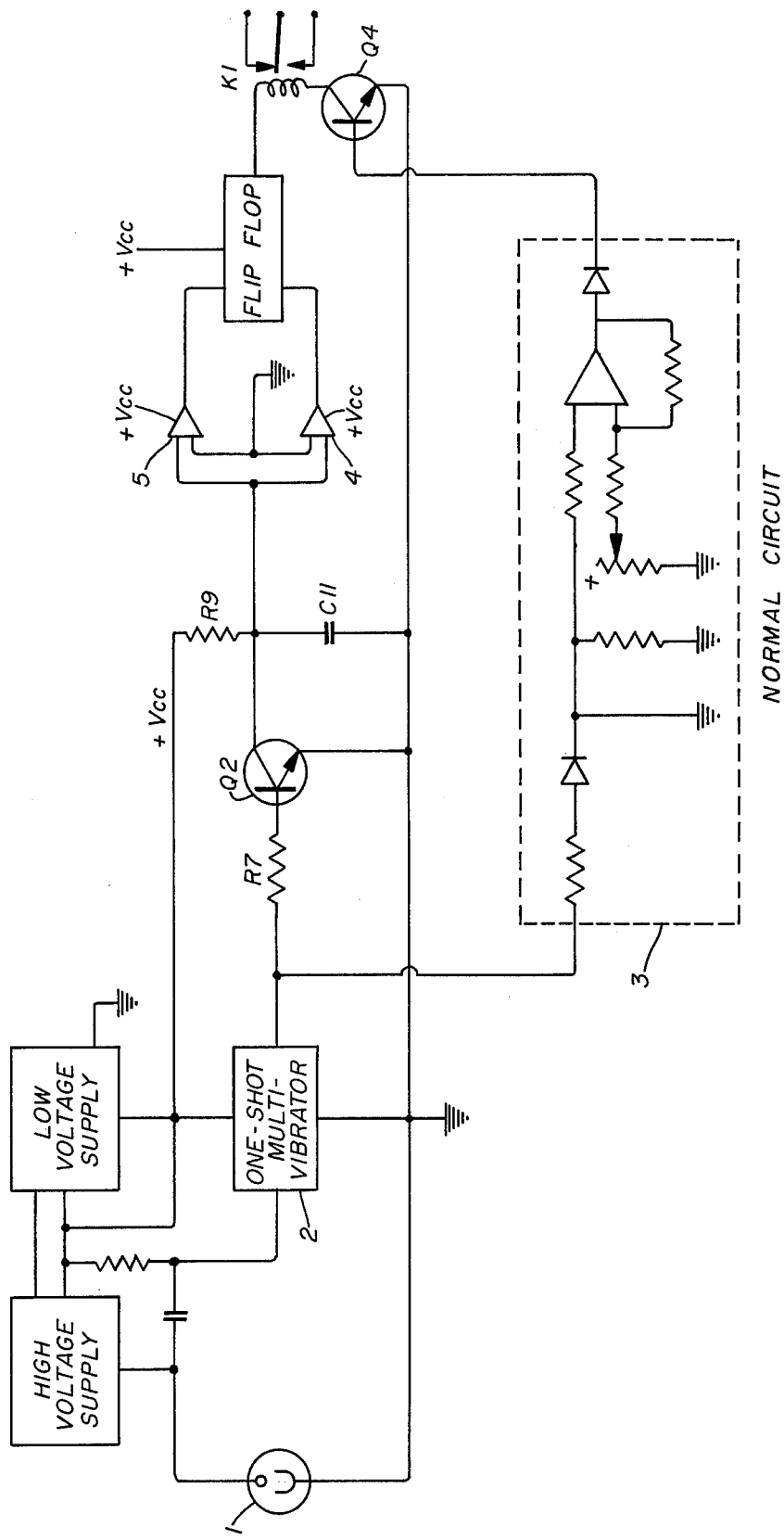

FAIL-SAFE CIRCUIT

BACKGROUND OF THE INVENTION

1. FIELD OF THE INVENTION

The invention relates to signalling circuit failure when the variable sensed generates its minimum signal in its normal range. More specifically, in a level detection circuit responding to radiation, the invention relates to low-level detection and signal of circuit failure during the period of normal level.

2. DESCRIPTION OF THE PRIOR ART

Circuits which actuate a relay when responding to a specified condition have several problems in providing a fail-safe mode of operation. It is well to consider level detection as an example. Further, those level detection circuits built to utilize radiation give a more specific example.

The more simple of the examples is that where a source of radiation is directed across a container of liquid in line with a detector of the radiation. When the level of the liquid lowers to where the radiation passes above the body of the liquid and is received at the detector, the circuit of the detector is activated to throw a relay in signal of the low level. Simple.

The problem of the prior art is that with the normal mode of operation, when the level is above the line of sight between the source and detector, the detector circuit is passive. The circuit is receiving the minimum normal input, or no input. Then the question descends. How is a failure of the circuit signalled? The circuit is passive during the normal level of the liquid. How are we to tell when it fails during this period? The prior art had no answer I was able to find.

SUMMARY OF THE INVENTION

It is an object of the invention to feed a low order of auxiliary signal through a detector circuit in all modes of operation and apply the auxiliary signal to keep the circuit of the relay connected to its source of power during that period the basic signal is at its minimum value.

The invention contemplates the use of either background, or auxiliary, radiation to generate a low order of signal through the detection circuit at all times. This low order of signal is applied to oppose interruption of power to the relay of the circuit. Then, when the basic signal to the circuit is at its lowest value, or the condition is normal, failure in the monitored part of the system will remove the auxiliary signal and its opposition to interruption of the connection between the relay and power.

Other objects, advantages and features of the invention will become apparent to one skilled in the art upon consideration of the written specification, appended claims, and attached drawing, wherein;

The drawing is both diagrammatic and schemmatic in disclosing the invention as included in a liquid level detection circuit.

DESCRIPTION OF THE PREFERRED EMBODIMENT

The present inventionn is embodied in a circuit generally comparable to the disclosure of U.S. Pat. No. 3,275,898 issued Sept. 27, 1966 to J. B. Rosso, et al. The circuit disclosed in the patent includes at one end, a Geiger tube and, at the other end a relay. The tube responds, as a primary element, to the gamma rays from a source and actuates, to manifest a predetermined magnitude of gamma rays, the solenoid relay.

The electric network, between the tube and relay, modifies the varying voltage impulses generated by the Geiger tube into square-wave pulses of voltage which are then integrated into a D.C. voltage which will control the resistance of a transistor in the connection between the solenoid relay and its power supply.

The function of the electric system of U.S. Pat. No. 3,275,898 can be traced in detail and compared with the system of this application. In both systems, gamma rays strike their Geiger tubes and develop voltage. This voltage is processed as pulses which are amplified as desired. The amplified pulses are then shaped to give them uniform height and width. A term in common usage to designate this circuit for producing voltage pulses of uniform shape is "one-shot multivibrator." The form of this circuit disclosed in U.S. Pat. No. 3,275,898 is explained in the patent in great detail.

In the disclosure of the U.S. Pat. No. 3,275,898, the voltage pulses generated by the one-shot multivibrator are provided resistance paths through which the pulses leak off. The arrangement of this circuit leaks off the pulses at a specific rate. Below the specific rate, the negative charge of the pulses will not build great enough to overcome the positive potential applied to the base of the relay transistor. At, or above, the specific rate, the positive bias will be overcome and render the transistor less conductive. This reduction in conduction of the transistor in series with the relay coil and power de-energizes the relay coil.

To generalize the normal operation of this type of circuit, an integrating circuit is formed to store the voltage pulses from the one-shot multivibrator. The stored, or integrated, voltage pulses then become a tool for control of the conductivity of the relay transistor.

In the drawing of this application, the preferred embodiment of the invention is disclosed in enough detail for one skilled in this art to reduce the invention to practice. Geiger tube 1 is prominently represented at the extreme left of the drawing. Relay K1 is to the extreme right. The source of gamma rays is not shown. The function of the basic radiation source, and its relation to tube 1, should now be clear.

Also, the auxiliary source is not shown on the drawing. Those skilled in the art will understand how it, or background radiation, will function as already discussed.

The normal circuit is to be looked upon as embodied in one-shot multivibrator 2 and the cluster of circuit components 3 which have been lumped together and shown as connected between 2 and the base of relay transistor Q4. This specific circuit arrangment is shown in detail but an explanation of its function need go no further than was done in the prior explanation I gave to the similar circuit of U.S. Pat. No. 3,275,898. The essential elements of the invention are in the circuit extending from resistance R7 to relay coil K1.

This circuit from R7 to K1 controls the connection between K1 and the source of power which will energize K1 to force the switch of the relay to one of two positions against spring resistance.

The disclosure of the circuit embodying the invention, and the functions of the circuit, will have more meaning if it includes reference to relative voltage levels within the circuit. It is conventional to refer to the basic voltage of a transistor circuit as +Vcc. Full +Vcc is needed to develop the switch-throwing capacity of K1.

In the disclosure the circuit of K1 it is connected to +Vcc. However, this connection is normally controlled by Q4. If Q4 is given a predetermined value of low resistance, K1 remains connected to, and energized by +Vcc. If the base voltage of Q4 renders it highly resistive, as a component of the circuit of K1, K1 will, effectively, be disconnected from power. It should now be evident to even those with low skill in the art that a voltage can be applied to the base of Q4 which will keep it highly resistive and a signal developed from the normal circuit which will lower the resistance of Q4 to where the power will energize K1. On the other hand, the voltage to the base can be applied to keep Q4 low in resistance and the voltage developed by the normal circuit applied to oppose the base voltage and render the resistance of Q4 high enough to disconnect K1.

The present invention is reduced to practice with the arrangement of the normal circuit in which Q4 is normally low in resistance. K1 is then connected to power and pulls its switch into a first of two positions. If K1 is then de-energized, its spring pulls the switch of the relay into the second of two positions. Now the invention in the circuit on the other side of K1 can disclosed.

As long as a preset level of signal is fed, from the one-shot 2, to the base of Q2 a discharge path is provided to keep capacitor C11 from charging to +Vcc. The circuit values were selected, in the reduction to practice, to provide ⅓Vcc, or less, to the input of comparator 4. This comparator 4 keeps the Flip-Flop set to an output of +Vcc. This +Vcc output of the Flip-Flop keeps K1 energized. This is the normal state of the circuit.

When the input of comparator 5 is allowed to reach ⅔Vcc the Flip-Flop changes state and the output lowers to zero volts. Relay K1 is then de-energized, signalling the failure of the circuits transmitting the preset level of signal from the one-shot 2. Thus we have a dynamic fail-safe circuit. At least we have a circuit which tells us if a failure occurs in the source, voltage supplies, Geiger tube and one-shot components.

Consider the signal from the normal circuit 3 at its lowest value. There is no input to the Geiger tube from the source. The radiation is blocked by the material whose level is sensed. Failure in the circuit generating the normal signal to Q4 would cause no change in the relay. Therefore, reliance must be upon the insertion of a signal of failure during normal operation.

When the auxiliary, or background, input to the system ceases, we can assume structural failure in the circuit components of the power source of power supplies, or tube or one-shot. Failure of this signal permits development of +Vcc to 5 which will lower the Flip-Flop output to zero, de-energizing K1 and allowing the relay spring to shift the relay switch to its alarm position.

CONCLUSION

The invention could be regarded as a monitor of a system which, in its normal mode of operation, holds in check a force which would de-energize the signal relay of the system. The normal system monitors an accumulation of material. The material could be liquid and its level in a container could be monitored by directly detected radiation across the vertical path traversed by the liquid. Inherently, the normal level, or above, of the liquid would obstruct the radiation and so shield the primary element of the system. The minimum signal would be normally generated which would place the relay of the system in one of its two positions.

In this normal mode of operation, the invention provides a steady, low-order, signal through the monitored portion of the system. This low-order of signal is pre-set so as to not actuate the relay through the normal system. However, it does generate enough force to control the connection of the system relay to a source of power which could actuate the relay. The low-order of signal is provided a circuit which will keep the relay connected to the power source. Then, if a component of the monitored system fails, the low-order signal is blocked from its circuit and the connection between the relay and power source is broken. The relay then goes to its second position to sound the alarm of failure. The result is that I have a dynamic fail-safe circuit for a low-level detection system.

From the foregoing, it will be seen that this invention is one well adapted to attain all of the ends and objects hereinabove set forth, together with other advantages which are obvious and inherent to the method and apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention, having been described, what is claimed is:

1. A method of monitoring a system for component failure in an an electric system in which a source of power is applied to a relay to hold the relay in one of two position, including, establishing a path of radiation transverse to a path in which material accumulates,
    effectively disconnecting the source of power from the relay when the material in its path does not block the radiation in its path, and
    generating a low-order radiation signal through a monitored portion of the electric system and applying the low-order signal to keep the source of power connected to the relay,
    whereby component failure in the monitored portion of the electric system will interrupt the low-order signal and effectively disconnect the source of power from the relay which will release the relay to the other of its two positions.

2. A circuit arranged and connected to actuate a relay in response to rediation received from a source along a path transverse to that of accumulating material, including,
    a source of power for actuation of a relay,
    a relay having two positions,
    a connection between the source of power and relay,
    a transistor in the connection whose base voltage determines the conductivity of the transistor and therefore whether the source and relay are effectively connected,
    a connection between the base of the transistor and circuit to normally provide a voltage for the base which will keep the source and relay effectively connected when the radiation from the source is blocked by material, an auxiliary source of radiation positioned to generate a relatively constant input ot the circuit, and a circuit section connected to receive the auxiliary input through a portion of the normal circuit and control the connection between the power source and relay so that failure of the normal circuit will cause the circuit section to effectively disconnect the power from the relay.

3. The circuit of claim 2, wherein, the radiation is received across a liquid level which moves vertically into the path between the source and receiving circuit, and the transistor receives a D.C. voltage from the circuit on its base when radiation is reveived by the circuit to render the transistor highly resistive and thereby disconnect the power source and relay.

4. The circuit of claim 3, wherein, the circuit section includes, a. a transistor connected to the circuit by its base to form a low resistance leakage path for the D.C. voltage generated by the auxiliary input, b. and combination of voltage comparators and Flip-Flop circuit across which the transistor is connected to connect and disconnect the power source and relay.

* * * * *